(12) United States Patent
Montemayor

(10) Patent No.: US 6,865,659 B2
(45) Date of Patent: Mar. 8, 2005

(54) USING SHORT REFERENCES TO ACCESS PROGRAM ELEMENTS IN A LARGE ADDRESS SPACE

(75) Inventor: Oscar A. Montemayor, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 398 days.

(21) Appl. No.: 10/165,160

(22) Filed: Jun. 7, 2002

(65) Prior Publication Data

US 2003/0229769 A1 Dec. 11, 2003

Related U.S. Application Data

(60) Provisional application No. 60/386,856, filed on Jun. 7, 2002.

(51) Int. Cl.[7] .............................................. G06F 12/04
(52) U.S. Cl. ...................................... 711/209; 711/220
(58) Field of Search ................................ 711/209, 219, 711/220

(56) References Cited

U.S. PATENT DOCUMENTS

| | | | | |
|---|---|---|---|---|
| 6,047,362 A | * | 4/2000 | Zucker | 711/203 |
| 6,085,296 A | * | 7/2000 | Karkhanis et al. | 711/147 |
| 6,098,111 A | * | 8/2000 | Maegawa et al. | 719/310 |
| 6,766,433 B2 | * | 7/2004 | Circello et al. | 711/202 |
| 2002/0174318 A1 | * | 11/2002 | Stuttard et al. | 712/13 |
| 2003/0066881 A1 | * | 4/2003 | Maenpaa et al. | 235/380 |

* cited by examiner

*Primary Examiner*—Matthew Kim
*Assistant Examiner*—Hetul Patel
(74) *Attorney, Agent, or Firm*—Park, Vaughan & Fleming, LLP

(57) ABSTRACT

One embodiment of the present invention provides a system that accesses a desired element during execution of a program. During operation, the system receives a reference to the desired element. The system determines if the reference is an internal reference to a location in a local package that is currently executing, or an external reference to a location in an external package. If the reference is an external reference, the system uses an index component of the reference to lookup an address for the desired element in a global reference table. Next, the system uses the address to access the desired element. Note that the address retrieved from the global reference table is larger than the reference, which allows the address to access a larger address space than is possible to access with the reference alone.

31 Claims, 6 Drawing Sheets

USING SHORT REFERENCES TO ACCESS PROGRAM ELEMENTS IN A LARGE ADDRESS SPACE

This application hereby claims priority under 35 U.S.C. §119 to U.S. Provisional Patent Application No. 60/386,856, filed on Jun. 7, 2002, entitled "JAVA CARD 2.2(0.1) Large Addrespace Reference Implementation," by inventors Oscar A. Montemayor and Saqid J. Abmad.

BACKGROUND

1. Field of the Invention

The present invention relates to addressing mechanisms within computer systems. More specifically, the present invention relates to a method and an apparatus for using short references to access program elements in a large address space.

2. Related Art

Dramatic advances in computer technology presently make it possible to integrate a significant amount of computing power onto "smart cards." Smart cards are used in a variety of applications to solve common security and identity needs. For example, smart cards have been integrated into credit cards, debit cards, corporate badges, and even cell phones.

In order to provide portability for smart card applications, some designers have begun to integrate virtual machines, such as the JAVA virtual machine, into smart cards. Smart cards containing a JAVA virtual machine are often referred to as "JAVA CARDS." Integrating a virtual machine into a smart card enables the smart card execute a large number of platform-independent applications. Moreover, the associated development environment for the virtual machine can simplify the process of developing applications for smart cards.

Smart card applications are beginning to access large amounts of data. For example, applications that use biometric data, digital certificates and GSM SIM cards must be able to access large amounts of application data, and these requirements are expected to grow ten-fold by the near future.

Unfortunately, the JAVA CARD virtual machine was originally designed to support 16-bit addresses, which limits the virtual machine to accessing 64 kilobytes of memory, unless more sophisticated strategies are used. Hence, existing JAVA CARD systems are likely to be hindered by the lack of storage capacity as well as addressing limitations.

16-bit computer systems typically use segmentation strategies to access memory beyond 64 kilobytes. Segmentation requires complex memory management structures, which consume a large amount of space. This is a problem in memory-constrained devices, such as smart cards, where memory space is very scarce. Furthermore, segmentation requires pre-allocation of memory, which tends to cause fragmentation of the address space, which also results in memory space being used inefficiently.

Hence, what is needed is a method and an apparatus that allows smart card applications to access a larger address space without the above-described disadvantages of segmentation.

SUMMARY

One embodiment of the present invention provides a system that accesses a desired element during execution of a program. During operation, the system receives a reference to the desired element. The system determines if the reference is an internal reference to a location in a local package that is currently executing, or an external reference to a location in an external package. If the reference is an external reference, the system uses an index component of the reference to lookup an address for the desired element in a global reference table. Next, the system uses the address to access the desired element. Note that the address retrieved from the global reference table is larger than the reference, which allows the address to access a larger address space than is possible to access with the reference alone.

In a variation on this embodiment, if the reference is an internal reference, the system determines a base address of a component in which the desired element is located, and adds an offset of the reference to the base address to produce the address for the desired element.

In a further variation, determining the base address of the component involves obtaining an identifier for the local package that is currently executing, and using the identifier to lookup an entry in a package location table, wherein the entry points to a component location table for the local package. Next, the system examines the component location table to determine the base address of the component. Note that the system may examine an instruction preceding the reference to determine which component the desired element is located in.

In a variation on this embodiment, the system installs a new package by calculating element addresses for all exported references associated with the new package, and then adding the element addresses to the global reference table. Next, the system replaces all external references within the new package with references to entries in the global reference table, wherein the entries in the global reference table contain element addresses for the desired elements.

In a variation on this embodiment, determining if the reference is an internal reference or an external reference involves examining a reserved bit within the reference, wherein the reserved bit indicates whether the reference is an internal reference or an external reference.

In a variation on this embodiment, looking up the address for the desired element in the global reference table involves retrieving an absolute address for the desired element from the global reference table.

In a variation on this embodiment, looking up the address for the desired element in the global reference table involves retrieving a relative address for the desired element from the global reference table, wherein the relative address specifies an offset relative to a base address of a component containing the desired element.

In a variation on this embodiment, the desired element can include: a class record; a static field; or a function.

In a variation on this embodiment, the reference is 16 bits in size and the address retrieved from the global reference table is 32 bits in size.

In a variation on this embodiment, the global reference table is stored as a multi-level table so that the entire global reference table does not have to be allocated at once.

In a variation on this embodiment, a given package includes: a static field component containing static fields; a class component containing class records; a function component containing functions; an export component; and an import component.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Smart Card

Figure 1:
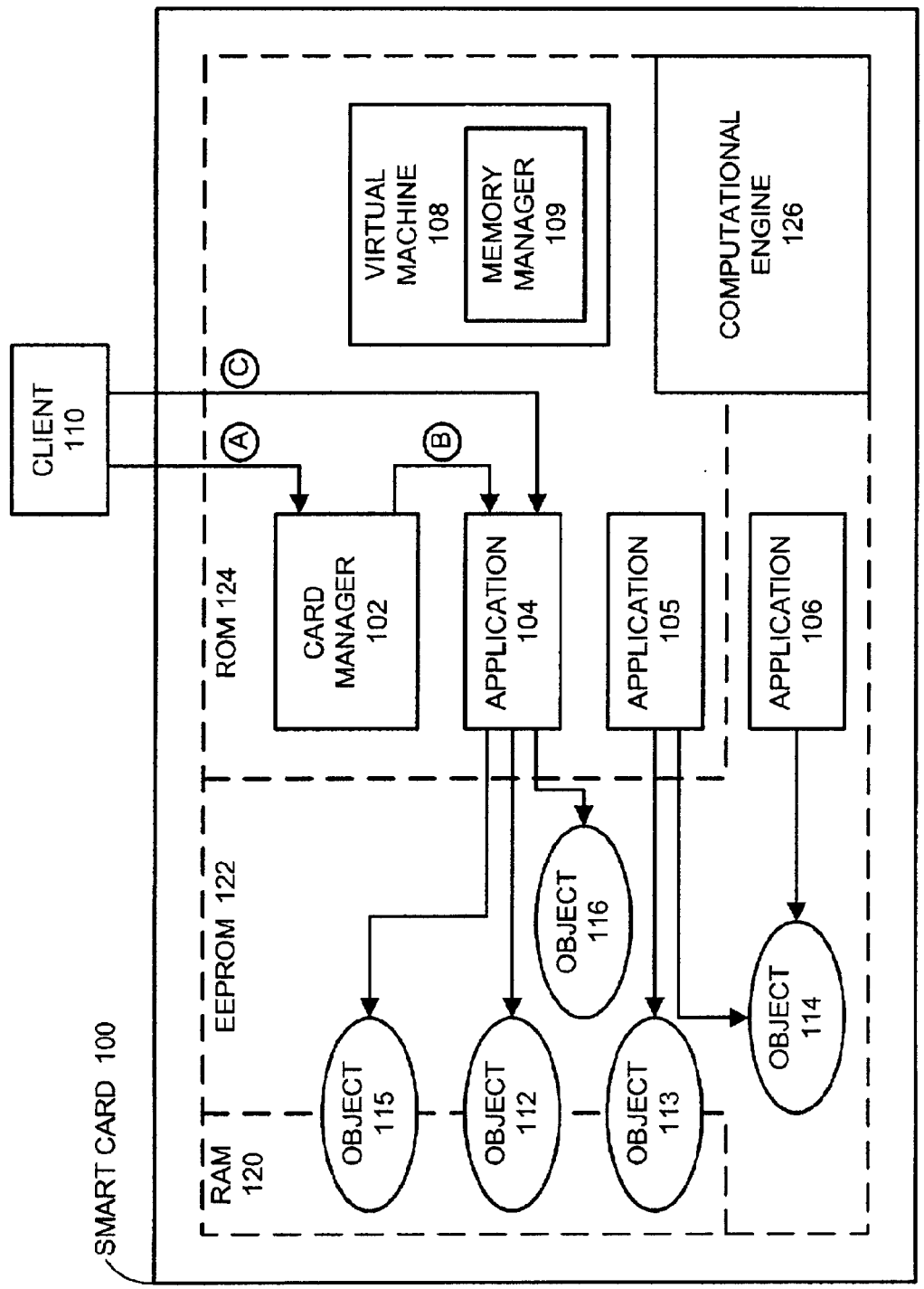
FIG. 1 illustrates a smart card in accordance with an embodiment of the present invention.

FIG. 1 illustrates a smart card 100 in accordance with an embodiment of the present invention. Smart card 100 can generally include any type of miniature computing device, such as may be located within identification cards, client loyalty cards, electronic wallets and cellular telephones. However, note that the present invention is not meant to be limited to smart cards, and can generally be applied to any type of computing device or computer system that stores objects in writeable non-volatile memory and/or volatile memory.

Smart card 100 contains a computational engine 126, which includes circuitry for performing computational operations. Smart card 100 also contains a number of different types of memory, including random access memory (RAM) 120, electrically erasable programmable read-only memory (EEPROM) 122 and read-only memory (ROM) 124. In general, RAM 120 can include any type of volatile random access memory; EEPROM 122 can include any type of writeable non-volatile memory, such as EEPROM, flash memory, or magnetic memory; and ROM 124 can include any type of read-only memory.

RAM 120 is used to store various data items and data structures. For example, as illustrated in FIG. 1, RAM 120 can contain portions of objects 112, 115 and 113. Note that objects 112, 113 and 115 are "transient objects" that include a persistent portion stored in EEPROM 122, and a transient portion stored in a RAM 120.

ROM 124 includes a virtual machine 108, such as the JAVA virtual machine developed by SUN Microsystems, Inc. of Santa Clara, Calif. Note that applications written in a platform-independent programming language, such as the JAVA programming language, can be executed on virtual machine 108. Virtual machine 108 includes a memory manager 109 that manages allocation and freeing of memory within smart card 100.

ROM 124 also contains a number of applications, 104 and 105, which provide services for clients accessing smart card 100. Other applications, such as application 106, can be located in EEPROM 122. Further applications (not illustrated) may be located in both ROM 124 and EEPROM 122.

ROM 124 also includes a card manager 102, which contains code for managing the execution of applications on smart card 100. For example, suppose a client 110 wishes to access a service provided by one of the applications 104–106 on smart card 100. Client 110 first communicates with card manager 102 (step A). Card manager 102 puts client 110 in contact with an application 104 (step B). This allows client 110 to communicate directly with application 104 (step C). Note that card manager 102 can also delete objects from memory.

RAM 120 and EEPROM 122 contain a number of objects 112–116, which are accessed by applications 104–105. More specifically, application 104 accesses objects 112, 115 and 116, application 105 accesses objects 113 and 114, and application 106 accesses object 114.

Data Structures

Figure 2:
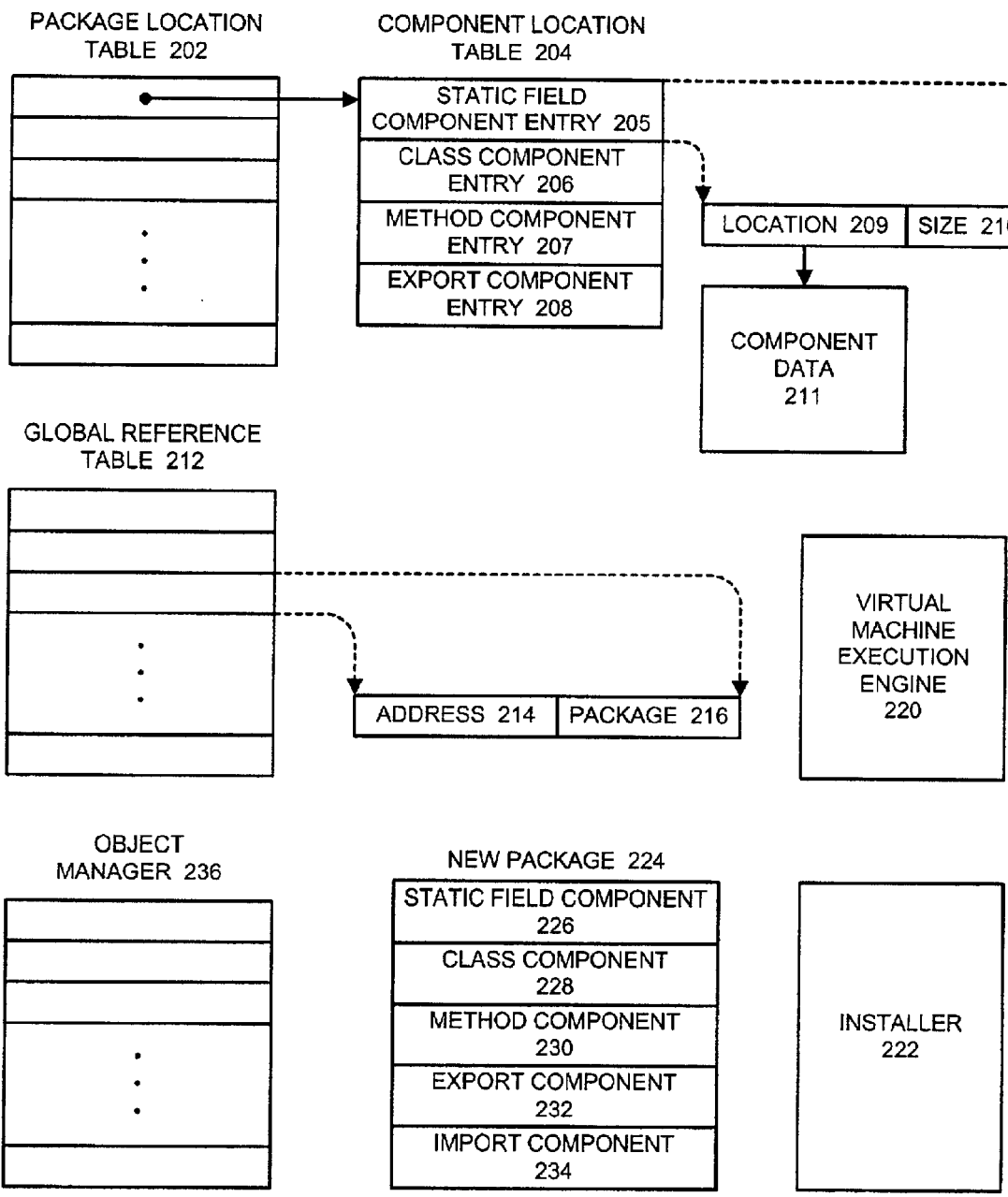
FIG. 2 illustrates data structures involved in the addressing operations in accordance with an embodiment of the present invention.

FIG. 2 illustrates various data structures involved in the addressing operations in accordance with an embodiment of the present invention. These data structures include package location table 202, global reference table 212 and object manager 236. During program execution, these data structures are operated on by an execution engine 200 that is part of virtual machine 108 illustrated in FIG. 1.

FIG. 2 also illustrates a new package 224, which is installed into the system by installer 222. This installation process is described in more detail below with reference to FIG. 5. Package location table (PLT) 202 stores pointers to specific packages and is indexed by a package identifier. For example, the first entry in PLT 202 is associated with a specific package and points to a component location table (CLT) 204 for the specific package. Component location table 204 stores entries for components that make up the specific package. In particular, component location table 204 contains static field component entry 205, class component entry 206, function component entry 207 and export component entry 208. Note that throughout this document, the use of the term "function" is meant to include the term "method" as it is used in object oriented programming. Each of these entries contains a location (base address) for the component as well as the size of the component. For example, static field component entry 205 contains a location 209 for the static field component as well as the size 210 of the static field component. Note that location 209 points to the base address of static field component which contains component data 211. Also note that the import component is not tracked because the import component is eliminated after it is used during installation as is described below with reference to FIG. 5.

Global reference table (GRT) 212 contains pointers to program elements, such as class records, static fields and functions. Each entry in GRT 212 contains an address 214 of a program element and a package identifier 216, which identifies the package to which the program element belongs. GRT 212 is used to convert short 16-bit external references into longer 32-bit addresses as is described below with reference to FIG. 6.

Object manager 236 is a table that is used to convert object identifiers into object addresses as is described below with reference to FIG. 7.

Multi-Level Global Reference Table

Figure 3:
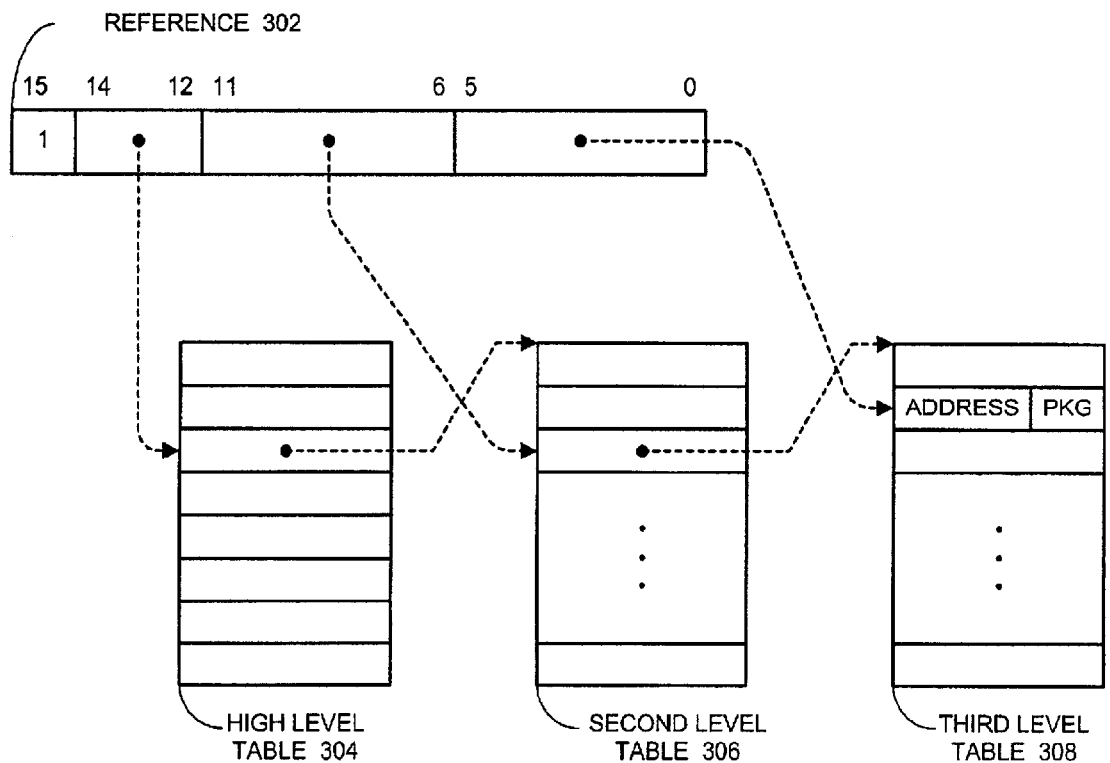
FIG. 3 illustrates a multi-level global reference table in accordance with an embodiment of the present invention.

FIG. 3 illustrates a multi-level implementation of global reference table (GRT) 212 in accordance with an embodiment of the present invention. In this embodiment, GRT 212 is divided into two or more levels of indirection, so that the entire table does not have to be allocated at once. The high-level table 304 is allocated the first time the card runs. Elements are subsequently allocated into the respective sub-tables.

When new entries are added into GRT 212, if a lower-level table already allocated exists with empty entries, the entries are added there first by looking for holes (from deleted entries) and then by appending new entries into the table.

When more entries are needed, a new lower-level table is allocated, containing a specified number of entries, which initially are empty. When a low-level table is emptied out due to deletion of all elements, it can be garbage-collected by the virtual machine. Each table is indexed by specific bits of the index reference. For example, in FIG. 3, GRT 212 is divided into 3 levels: a high-level table 304 containing 8 entries (3 bits, indexed by bits 12–14), that are either empty or holding a reference into a second-level table. Each second-level table, such as second-level table 306, can hold 64 entries (6 bits, indexed by bits 6–11 of the reference index), wherein each entry is either empty or contains a reference to a third-level table.

Each third-level table, such as third-level table 308, can hold 64 entries (6 bits, indexed by bits 0–5 of the index reference), and can contain the actual element addresses, or possibly empty entries with no element associated with them.

This indexed design allows for fast access during execution because each index reference can be divided into its bit components that are used to quickly index the table and find the entry. The cost of finding the entry address is: one memory access per level, one shift right operation per level, one multiplication per level, and one addition per level. For the three-level table illustrated in FIG. 3, accesses require 12 operations. These operations are fast, and hence should not cause significant delays during program execution.

Reference Formats

Figure 4:
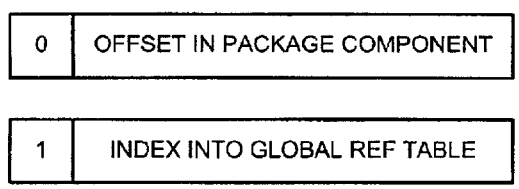
FIG. 4 illustrates two reference formats in accordance with an embodiment of the present invention.

FIG. 4 illustrates two reference formats in accordance with an embodiment of the present invention. As is illustrated in FIG. 4, if the high-order bit of a 16-bit reference is a zero, the remaining 15 bits specify an offset into a local package component. Otherwise, if the high-order bit is a one, the remaining 15 bits specify an index into global reference table 212 illustrated in FIG. 2. This index is used to retrieve the address of a desired element from global reference table 212 as is described below with reference to FIG. 6.

Address Conversion Process

In one embodiment of the present invention, smart card 100 is a JAVA CARD. The JAVA CARD application unit is referred to as a "package." A package contains a set of classes, which could also act as library classes, and can also contain applets, each representing a unique card application. Each package is individually contained inside a Converted Applets (CAP) file—a portable binary format used to distribute JAVA CARD applications. One or more package CAP files can be installed into a JAVA CARD device at a given time, wherein each package CAP file contains one or more applications.

Packages can interact with each other—normally by performing API calls or by accessing classes, fields or functions defined on different packages. Code inside a given package uses references to access both internal and external elements. These references usually map to the memory address where the desired element is located. Note that a package can export its elements to make them available to other packages to link to.

One embodiment of the present invention relies in the properties of JAVA CARD packages to overcome the 64-kilobyte memory limit for JAVA CARD. When the package is stored in a CAP file, all internal references to packages are given as offsets, while external references are usually associated with tokens that must be mapped against external packages' export components for linking purposes.

In prior JAVA CARD implementations, when a package is installed, all references—both external and internal—are resolved into 16-bit addresses. Hence, in prior implementations a package cannot address memory beyond 64 kilobytes. If the package were to be installed into a 32-bit smart card using a similar technique (where references are represented as 32-bit addresses), all references in the smart card would have to be recalculated, because the CAP file structure implicitly assumes a 16-bit architecture.

One embodiment of the present invention presumes references in the CAP file will remain 16 bits in size, in order to avoid conflict with existing CAP file structures. This embodiment establishes a mapping between the 16-bit references and the actual 32-bit addresses they represent. Note that the references themselves are structured to encode information on how to locate the element address they represent.

All references, upon installation, are modified by the installer 222. Internal references within the package are largely left intact from the CAP file. The high-order bit (bit 15) is marked as "0," while the 15 low-order bits (bits 0–14) encode the offset of the element within the component. Note that a component could be a function, a class, or a static field. The bytecode that precedes a reference determines how the reference is interpreted.

In order to convert such a reference into an address, the JAVA CARD virtual machine must first know which package it is executing. Once it has this information, it uses the package identifier to obtain a reference to a table containing the individual package's different component addresses. Depending on the bytecode, the lower 15 bits of the reference could be interpreted as an offset into the class, function or static field components of the package. The virtual machine then retrieves from the component table the base address of the component in question and adds the offset from the reference to the address obtained. This produces the memory address of the element desired, which might be at a memory space beyond 16-bit range (i.e. above 64 kilobytes of RAM).

External references, on the other hand, are more complicated to process. During installation, installer 222 revises all references to be exported. For each exported reference, installer 222 calculates the element address (which could be larger than 16 bits) and adds the element address to global reference table 212. (Note that there can be a single global reference table for all elements, or one for each type of element; static fields, functions and classes.) The table structure returns a reference index to installer 222. Installer 222 places this reference index inside the new package's export component. In doing so, the system replaces the referenced entry's package offset in the respective component with the returned reference index. In this way, a package is prepared so that other packages can be linked to it.

In a similar way, all the references that this package makes to other packages are resolved. When an external reference is found, the installer consults the new package's import component and locates the external package that the remote reference is referring to. The installer then goes to the external package's export component (which is already be installed in the card) and retrieves the index reference stored in the export component. Finally, the external reference is replaced by the index reference obtained. An index reference can be differentiated from a local reference, since the high-order bit (bit 15) is set to "1," while the lower 15 bits (bits 0–14) represent the index into global reference table 212. In addition to storing references, global reference table 212 also stores the package ID associated with the respective reference. Such entry can be used for complex bytecode execution (like checkcast, instanceof), virtual function calls (to find out new package ID of execution) or for package deletion purposes.

Please note that when following the above strategy, the address space that can be used by each component size is limited to 32,768 bytes, a limit imposed by the CAP file format that cannot be expanded. However, this strategy guarantees that each package component will have up to 32,768 bytes for code individually. Hence, each package's static field, class, function and export component can be as long as 32,768 bytes each. However, since each package component can grow up to 32,768 bytes, the addition of all components from all packages can well exceed 32,768 bytes, and even 65,536 bytes (64 kilobytes) in total, because the size of each individual component does not restrict the size of other components. Therefore, the above-described technique overcomes the 64-kilobyte addressing limit.

During bytecocle execution, the JAVA CARD virtual machine keeps track of the package where the current code is located. When a local reference is found, the virtual machine consults the local package's component location table to get the component base address and simply adds the offset component from the reference. When the JAVA CARD virtual machine encounters an external reference, it extracts the index component from the reference and uses it to access the respective global reference table. An address, which could be greater than 16 bits in size, is returned. The virtual machine then uses the returned address to access the desired element. In addition, for some bytecodes like checkcast, instanceof, and for all function calls across packages, the JAVA CARD virtual machine can obtain the package ID associated with the element, which is also stored in the global reference table.

Furthermore, each package can create objects, which can be stored at any address, even higher than 64 kilobytes. Newly created objects are inserted into the object manager data structure, which stores their address (which could be 32 bits in length) and assigns each object a 16-bit reference. Such 16-bit references are stored into static fields or given as parameters for virtual or interface function calls.

Note that the structure of the object manager table 236 in FIG. 2 is similar to global reference table 212. It is merely specialized for objects with optimizations to aid in garbage collection.

For package deletion, the fact that each entry has also a package ID associated with it makes it easier to remove entries from the table. During the package deletion process, two methods can be used: all table elements can be scanned and deleted entries marked, or the export component of the package to delete could be scanned for exported references, and such references marked in the table. Since the table is designed to use holes from deleted entries first, it is guaranteed that slots previously occupied by deleted references will be filled by new references when new packages are installed.

Note that by using the method above on a 16-bit JAVA CARD, a maximum of 32,767 exported elements of each type (objects, functions, static fields, classes) will be able to exist in the card. It is not be possible to have more elements of each type than the available number of index references, since each index reference must be unique inside the smart card.

The different processes involved in the address resolution process are described in more detail below.

Process of Installing a Package

Figure 5:
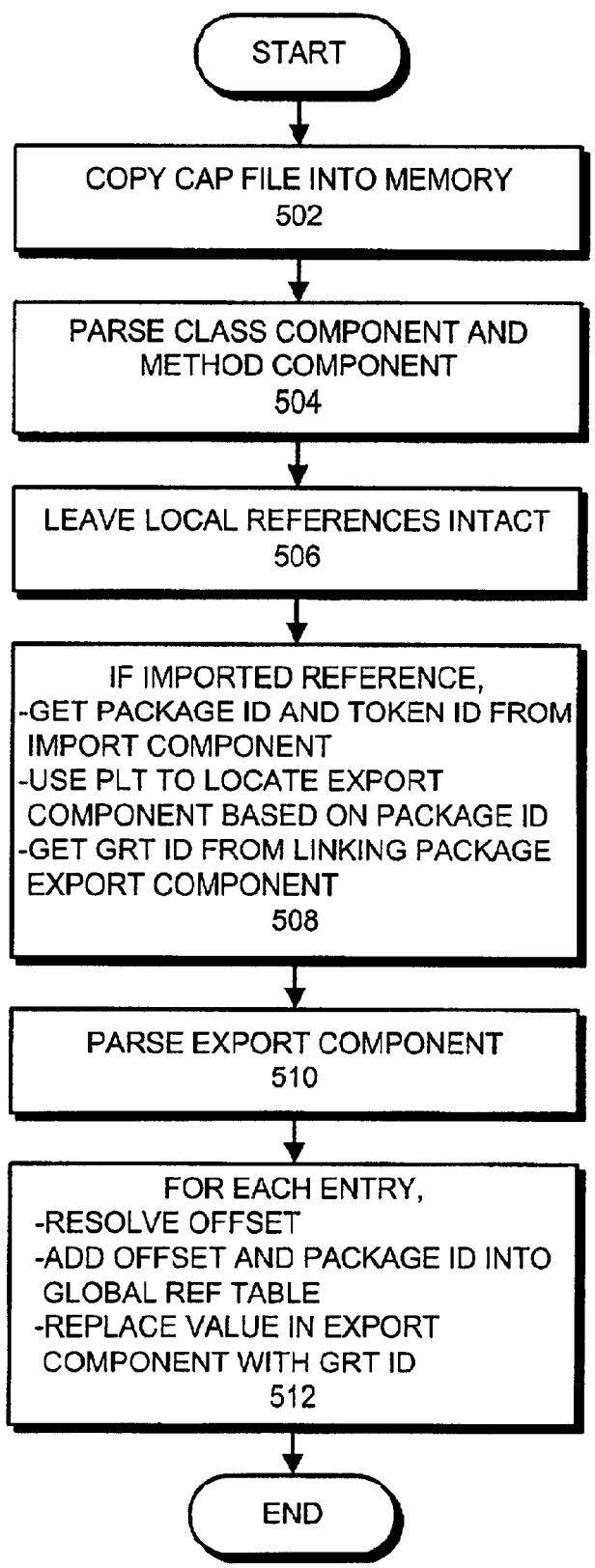
FIG. 5 is a flow chart illustrating the process of installing a package in accordance with an embodiment of the present invention.

FIG. 5 is a flow chart illustrating the process of installing a new package 224 into a smart card 100 in accordance with an embodiment of the present invention. The system starts by copying the CAP file containing the new package 224 into the smart card 100 (step 502). Next, the system parses the various components of the new package 224, including the class component and the function component (step 504).

During this process, the system leaves local references intact (step 506).

In contrast, imported references are modified. This can involve retrieving the package ID and token ID for the imported reference from the import component of new package 224. Next, the system uses the package ID to locate the export component of the linking package. The system then retrieves a global reference table index from the export component of the linking package (step 508).

Next, the system parses the export component of the new package (step 510). For each entry in the export component, the system resolves the address, adds the address and package ID into the global reference table, and replaces the value in the export component of new package 224 with the index of the address in global reference table 212 (step 512). This allows subsequent packages to link into the export component of new package 224.

Process of Converting an Element Reference into an Element Address

Figure 6:
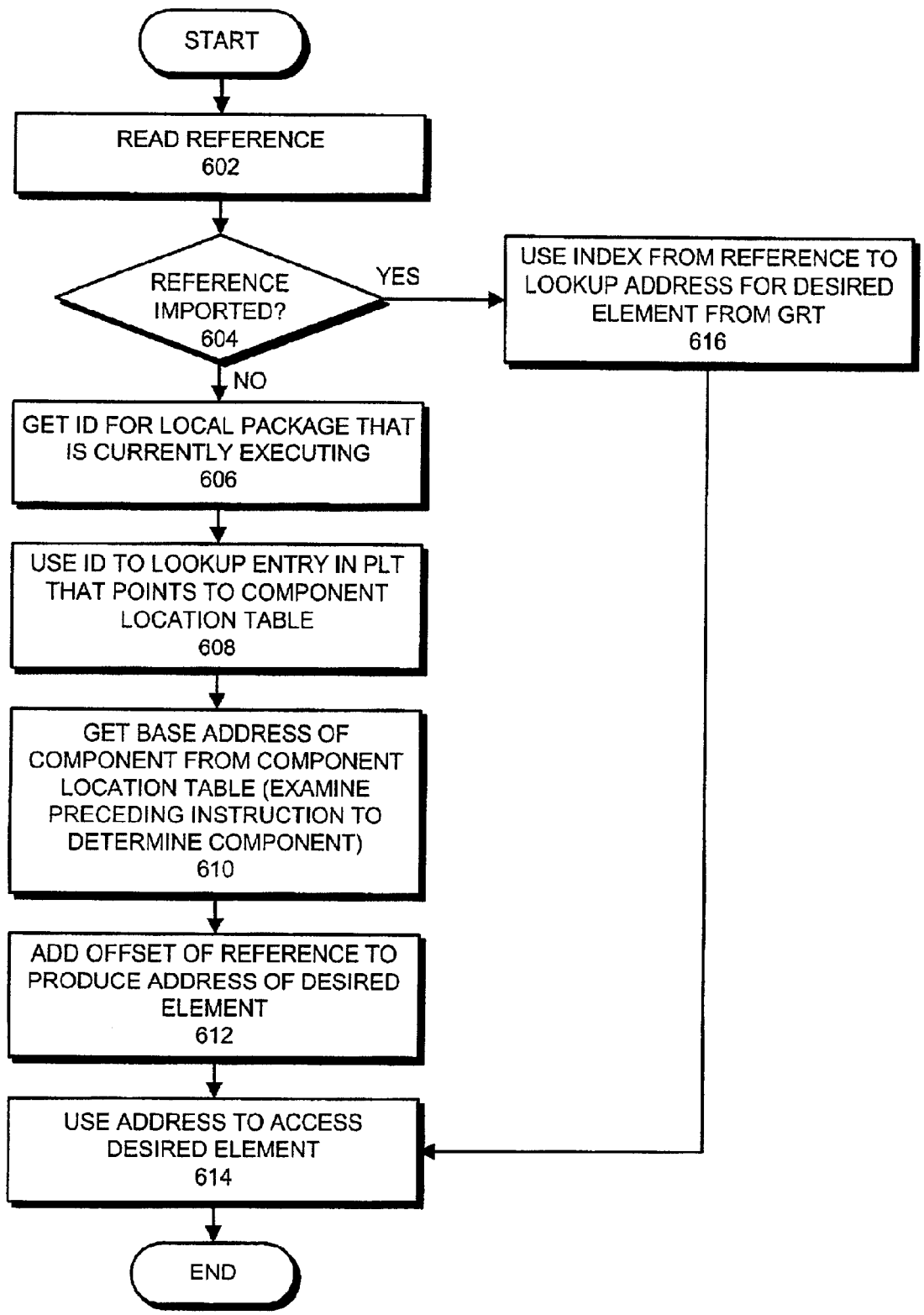
FIG. 6 is a flow chart illustrating the process of converting a reference into an address of a desired element in accordance with an embodiment of the present invention.

FIG. 6 is a flow chart illustrating the process of converting an element reference into an element address in accordance with an embodiment of the present invention. The process starts by reading a reference (step 602) and then examining the high-order bit of the reference to determine whether the reference is imported or local (step 604).

If the reference is imported, the system uses the index from the reference to lookup the address of the desired element in the global reference table 212 (step 616). The system uses this address to access the desired element (step 614).

If the reference is local at step 606, the system obtains an identifier for the local package that is currently executing (step 606). (This may involve examining the stack.) The system uses this identifier to lookup an entry in package location table 202, which points to a component location table for the package (step 608).

Next, the system gets the base address of the component from the component location table (step 610). This may involve examining a preceding byte code instruction to determine which component the access is directed to.

Next, the system adds the offset to the base address to produce the address of the desired element (step 612). Note that this address can be larger than the original reference. The system then uses the address to access the desired element (step 614).

Process of Converting an Object Reference into an Object Address

Figure 7:
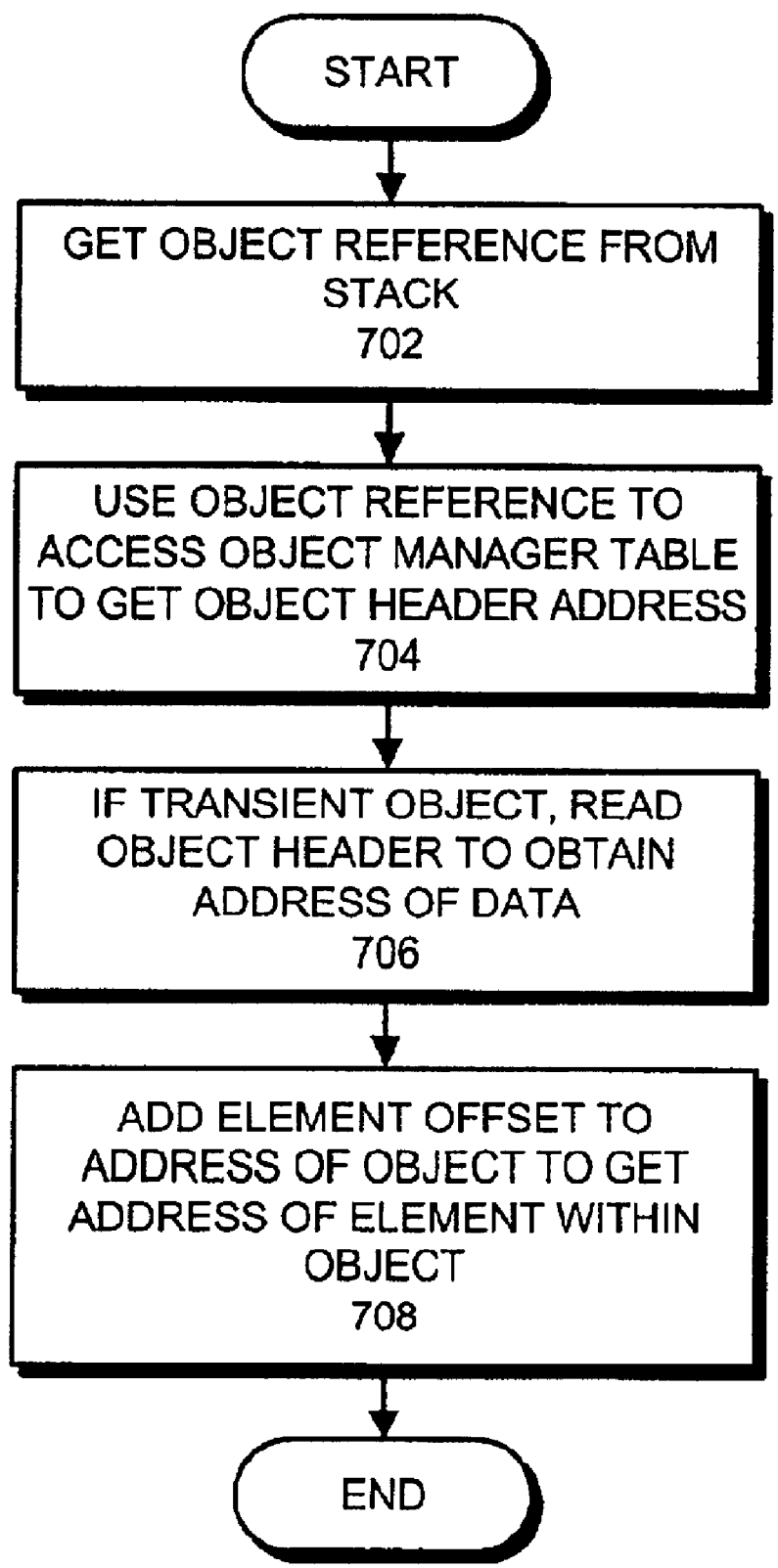
FIG. 7 is a flow chart illustrating the process of converting an object reference into an object address in accordance with an embodiment of the present invention.

FIG. 7 is a flow chart illustrating the process of converting an object reference into an object address in accordance with an embodiment of the present invention. The system starts by obtaining an object reference from the system stack (step 702). The system uses this object to reference and retrieve an entry from the object manager table 236 from FIG. 2 (step 704). If the object is a transient object, the system reads the object header to obtain the location of the object data step (706). The system then adds an element offset to the address of the object to get an address of an element within the object (step 708).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for accessing a desired element during execution of a program, comprising:
   receiving a reference to the desired element during execution of the program;
   determining if the reference is an internal reference to a location in a local package that is currently executing, or an external reference to a location in an external package;
   if the reference is an external reference, using an index component from the reference to look up an address for the desired element in a global reference table; and
   using the address to access the desired element;
   wherein the address retrieved from the global reference table is larger than the reference, thereby allowing the address to access a larger address space than is possible to access with the reference alone;
   if the reference is an internal reference, determining a base address of a component in which the desired element is located, wherein determining the base address of the component involves:
      obtaining an identifier for the local package that is currently executing,
      using the identifier to look up an entry in a package location table, wherein the entry points to a component location table for the local package, and
      examining the component location table to determine the base address of the component; and
   adding an offset of the reference to the base address to produce the address for the desired element.

2. The method of claim 1, wherein examining the component location table involves first examining an instruction preceding the reference to determine which component the desired element is located in.

3. The method of claim 1, further comprising installing a new package, wherein installing the new package involves:
   calculating element addresses for all exported references associated with the new package;
   adding the element addresses to the global reference table; and
   replacing all external references within the new package with references to entries in the global reference table, wherein the entries in the global reference table contain element addresses for the desired elements.

4. The method of claim 1, wherein determining if the reference is an internal reference or an external reference involves examining a reserved bit within the reference, wherein the reserved bit indicates whether the reference is an internal reference or an external reference.

5. The method of claim 1, wherein looking up the address for the desired element in the global reference table involves retrieving an absolute address for the desired element from the global reference table.

6. The method of claim 1, wherein looking up the address for the desired element in the global reference table involves retrieving a relative address for the desired element from the global reference table, wherein the relative address specifies an offset relative to a base address of a component containing the desired element.

7. The method of claim 1, wherein the desired element includes:
   a class record;
   a static field; and
   a function.

8. The method of claim 1, wherein the reference is 16 bits in size and the address retrieved from the global reference table is 32 bits in size.

9. The method of claim 1, wherein the global reference table is stored as a multi-level table so that the entire global reference table does not have to be allocated at once.

10. The method of claim 1, wherein a given package includes:
   a static field component containing static fields;
   a class component containing class records;
   a function component containing functions;
   an export component; and
   an import component.

11. A computer-readable storage medium storing instructions that when executed by a computer cause the computer to perform a method for accessing a desired element during execution of a program, the method comprising:
   receiving a reference to the desired element during execution of the program;
   determining if he reference is an internal reference to a location in a local package that is currently executing, or an external reference to a location in an external package;
   if the reference is an external reference, using an index component from the reference to look up an address for the desired element in a global reference table; and
   using the address to access the desired element;
   wherein the address retrieved from the global reference table is larger than the reference, thereby allowing the address to access a larger address space than is possible to access with the reference alone;
   if the reference is an internal reference, determining a base address of a component in which the desired element is located, wherein determining the base address of the component involves:
      obtaining an identifier for the local package that is currently executing;
      using the identifier to look up an entry in a package location table, wherein the entry points to a component location table for the local package, and
      examining the component location table to determine the base address of the component; and adding an offset of the reference to the base address to produce the address for the desired element.

12. The computer-readable storage medium of claim 11, wherein examining the component location table involves first examining an instruction preceding the reference to determine which component the desired element is located in.

13. The computer-readable storage medium of claim 11, wherein the method further comprises installing a new package, wherein installing the new package involves:
calculating element addresses for all exported references associated with the new package;
adding the element addresses to the global reference table; and
replacing all external references within the new package with references to entries in the global reference table, wherein the entries in the global reference table contain element addresses for the desired elements.

14. The computer-readable storage medium of claim 11, wherein determining if the reference is an internal reference or an external reference involves examining a reserved bit within the reference, wherein the reserved bit indicates whether the reference is an internal reference or an external reference.

15. The computer-readable storage medium of claim 11, wherein looking up the address for the desired element in the global reference table involves retrieving an absolute address for the desired element from the global reference table.

16. The computer-readable storage medium of claim 11, wherein looking up the address for the desired element in the global reference table involves retrieving a relative address for the desired element from the global reference table, wherein the relative address specifies an offset relative to a base address of a component containing the desired element.

17. The computer-readable storage medium of claim 11, wherein the desired element includes:
a class record;
a static field; and
a method.

18. The computer-readable storage medium of claim 11, wherein the reference is 16 bits in size and the address retrieved from the global reference table is 32 bits in size.

19. The computer-readable storage medium of claim 11, wherein the global reference table is stored as a multi-level table so that the entire global reference table does not have to be allocated at once.

20. The computer-readable storage medium of claim 11, wherein a given package includes:
a static field component containing static fields;
a class component containing class records;
a method component containing methods;
an export component; and
an import component.

21. An apparatus that facilitates accessing a desired element during execution of a program, comprising:
an execution mechanism that is configured to receive a reference to the desired element during execution of the program; and
an address resolution mechanism that is configured to determine if the reference is an internal reference to a location in a local package that is currently executing, or an external reference to a location in an external package;
wherein if the reference is an external reference, the address resolution mechanism is configured to use an index component from the reference to look up an address for the desired element in a global reference table;
wherein the execution mechanism is additionally configured to use the address to access the desired element;
wherein the address retrieved from the global reference table is larger than the reference, thereby allowing the address to access a larger address space than is possible to access with the reference alone;
wherein if the reference is an internal reference, the address resolution mechanism is additionally configured to:
determine a base address of a component in which the desired element is located;
wherein while determining the base address of the component, the address resolution mechanism is configured to:
obtain an identifier for the local package that is currently executing, and
use the identifier to look up an entry in a package location table, wherein the entry points to a component location table for the local package; and to
examine the component location table to determine the base address of the component; and to
add an offset of the reference to the base address to produce the address for the desired element.

22. The apparatus of claim 21, wherein while examining the component location table, the address resolution mechanism is configured to first examine an instruction preceding the reference to determine which component the desired element is located in.

23. The apparatus of claim 21, further comprising a package installation mechanism that is configured to:
receive a new package to be installed;
calculate element addresses for all exported references associated with the new package;
add the element addresses to the global reference table; and to
replace all external references within the new package with references to entries in the global reference table, wherein the entries in the global reference table contain element addresses for the desired elements.

24. The apparatus of claim 21, wherein while determining if the reference is an internal reference or an external reference, the address resolution mechanism is configured to examine a reserved bit within the reference, wherein the reserved bit indicates whether the reference is an internal reference or an external reference.

25. The apparatus of claim 21, wherein while looking up the address for the desired element in the global reference table, the address resolution mechanism is configured to retrieve an absolute address for the desired element from the global reference table.

26. The apparatus of claim 21, wherein while looking up the address for the desired element in the global reference table, the address resolution mechanism is configured to retrieve a relative address for the desired element from the global reference table, wherein the relative address specifies an offset relative to a base address of a component containing the desired element.

27. The apparatus of claim 21, wherein the desired element includes:
a class record;
a static field; and
a method.

28. The apparatus of claim 21, wherein the reference is 16 bits in size and the address retrieved from the global reference table is 32 bits in size.

29. The apparatus of claim 21, wherein the global reference table is stored as a multi-level table so that the entire global reference table does not have to be allocated at once.

30. The apparatus of claim 21, wherein a given package includes:
- a static field component containing static fields;
- a class component containing class records;
- a method component containing methods;
- an export component; and
- an import component.

31. A means for accessing a desired element during execution of a program, comprising:
- an execution means for receiving a reference to the desired element during execution of the program;
- a determining means for determining if the reference is an internal reference to a location in a local package that is currently executing, or an external reference to a location in an external package;
- a lookup means, wherein if the reference is an external reference, the lookup uses an index component from the reference to look up an address for the desired element in a global reference table; and
- wherein the execution means uses the address to access the desired element;
- wherein the address retrieved from the global reference table is larger than the reference, thereby allowing the address to access a larger address space than is possible to access with the reference alone;
- wherein if the reference is an internal reference, the determining means determines a base address of a component in which the desired element is located, wherein determining the base address of the component involves:
  - obtaining an identifier for the local package that is currently executing,
  - using the identifier to look up an entry in a package location table, wherein the entry points to a component location table for the local package, and
  - examining the component location table to determine the base address of the component; and
- adding an offset of the reference to the base address to produce the address for the desired element.

* * * * *